United States Patent [19]
Castle et al.

[11] Patent Number: 5,662,727
[45] Date of Patent: Sep. 2, 1997

[54] TWIN TOWER AIR DRYER FOR AN AIR COMPRESSOR UNIT

[75] Inventors: T. Kevin Castle, Wellford; Michael V. Kazakis, Simpsonville, both of S.C.

[73] Assignee: Westinghouse Air Brake Company, Wilmerding, Pa.

[21] Appl. No.: 597,076

[22] Filed: Feb. 6, 1996

[51] Int. Cl.$^6$ ............................................. B01D 29/66
[52] U.S. Cl. ........................... 96/130; 34/80; 55/218; 55/276; 55/DIG. 17; 96/141
[58] Field of Search .......................... 96/121, 122, 130, 96/133–137, 139–141; 95/116–121; 55/213, 218, 276, 212, DIG. 17; 34/80–82; 62/93, 94

[56] References Cited

U.S. PATENT DOCUMENTS

| | | | |
|---|---|---|---|
| 3,592,563 | 7/1971 | Glass et al. | 96/136 X |
| 3,937,622 | 2/1976 | Hewitt et al. | 55/DIG. 17 |
| 4,231,768 | 11/1980 | Seibert et al. | 96/136 X |
| 4,361,425 | 11/1982 | Hata | 55/218 |
| 4,781,209 | 11/1988 | Nelander et al. | 96/133 X |
| 5,344,474 | 9/1994 | Null | 96/130 X |
| 5,378,266 | 1/1995 | Elamin | 96/133 X |
| 5,423,129 | 6/1995 | Castle et al. | 34/80 |
| 5,458,677 | 10/1995 | VanderMolen | 96/141 X |
| 5,515,686 | 5/1996 | Jordan | 96/136 X |

Primary Examiner—Richard L. Chiesa
Attorney, Agent, or Firm—James Ray & Associates

[57] ABSTRACT

A twin tower gas drying system is disclosed for filtering unpurified gas to supply purified gas to a pneumatic system. The drying system includes a separator, two coalescers, two desiccant towers and a mechanism for controlling flow of unpurified and purified gases therethrough. The separator separates moisture and other particulates from the unpurified gas. Each coalescer removes moisture remaining within the unpurified gas. A first tower removes moisture remaining within unpurified gas received from a first coalescer to provide a first stream of purified gas. A second tower removes moisture remaining within unpurified gas received from a second coalescer to provide a second stream of purified gas. The flow controlling mechanism enables the drying system to alternately (i) extract moisture from unpurified gas passing through the first coalescer and tower to supply the pneumatic system with an output percentage of the first stream while purging moisture both previously collected in the second tower and coalescer by passing a purge percentage of the first stream through the second tower and coalescer and expelling the remoisturized gas to atmosphere via the mechanism and (ii) extract moisture from unpurified gas passing through the second coalescer and tower to supply the pneumatic system with the output percentage of the second stream while purging moisture both previously collected in the first tower and coalescer by passing the purge percentage of the second stream through the first tower and coalescer and expelling the remoisturized gas to atmosphere via the mechanism.

22 Claims, 5 Drawing Sheets

TWIN TOWER AIR DRYER FOR AN AIR COMPRESSOR UNIT

CROSS-REFERENCE TO RELATED APPLICATIONS

This application is related to copending applications Ser. Nos. 08/597,261 and 08/597,262 both sharing the same filing date of the present application, Feb. 6, 1996, and filed currently herewith. These patent applications are assigned to the assignee of the present invention, and the teachings therein are incorporated into the present application by reference thereto.

FIELD OF THE INVENTION

The present invention generally relates to a system for drying air supplied by a compressor unit for use in a pneumatic system. More particularly, the present invention pertains to a twin tower air drying system which alternately switches between removing moisture from air to be used by the pneumatic system by passing it through a first drying assembly while purging from a second drying assembly moisture previously collected therein and removing moisture from air to be used by the pneumatic system by passing it through the second drying assembly while purging from the first drying assembly moisture previously collected therein.

BACKGROUND OF THE INVENTION

Air drying systems are well known and practiced in a variety of technical fields. One such prior art air drying system is a single tower system illustrated in FIG. 1 of U.S. Pat. No. 5,423,129. Shown herein as prior art FIG. 1, the prior art single tower air drying system is designed to provide clean and dry compressed air to a pneumatic system such as a brake system of a railroad train. The prior art system accomplishes this by removing moisture and airborne particulates from a stream of compressed air as it passes through a desiccant material contained within the single tower.

FIG. 1 illustrates a cross-sectional view of the prior art system. From right to left FIG. 1 shows an opening through which unpurified compressed air is received; a sump volume; the single tower housing the desiccant material; a purge check valve with a choke; a side chamber connected to a purge volume; a discharge air filter element; a discharge check valve; and an output chamber through which purified compressed air passes eventually to the pneumatic system.

In operation, the prior art air drying system receives from an air compressor (not shown) a supply of air which typically contains an unacceptably high amount of moisture and other particulates suspended therein. This unpurified compressed air passes into the sump volume and then flows upwardly eventually reaching the desiccant material. The desiccant plays the key role within the single tower air drying system in that it absorbs the moisture and traps various particulates (e.g., dust, dirt, etc.) as the compressed air moves radially into and through the desiccant material. Once moisture and particulates are extracted from the air stream, the cleaned and dried compressed air continues flowing from the center of the desiccant material through the purge check valve situated near the top of the single tower. This purified compressed air then passes through the side chamber eventually reaching the purge volume.

The purge volume of the prior art air drying system is capable of holding approximately five-hundred cubic inches (500 in$^3$) of purified compressed air. When the air compressor is cycled off, the single tower system operates in a purge mode. During the purge mode, the purified pressurized air contained within the purge volume passes slowly in the reverse direction through the choke in the purge check valve and then back through the desiccant material. This slow stream of dried air reabsorbs a portion of the moisture previously collected within the desiccant material. Having evaporated in this passing stream of dry air, the evaporated moisture eventually exhausts through the sump volume to atmosphere. This gradual purging of dry air back through the system serves to dry out and thus rejuvenate the desiccant material. When the air compressor is again cycled on, the single tower system operates in a drying mode. During the drying mode, the desiccant material then again removes moisture from the stream of unpurified compressed air passing therethrough.

There are, however, several disadvantages inherent to the prior art drying system. Perhaps the most apparent disadvantage is that the source of unpurified compressed air must be cycled off in order to purge the desiccant material of the moisture it has accumulated. This serves to deprive temporarily the pneumatic system of a steady supply of clean and dried compressed air while the compressor is turned off. This shortcoming can prove quite inconvenient in certain applications.

Another disadvantage of the single tower air drying system is that it is only capable of removing a certain amount of moisture during the purge mode. Because the volume of unpurified air flowing into the prior art system vastly exceeds the volume of purified air used to purge the desiccant material, the desiccant material never adequately exsiccates during operation of the single tower system. Apparently, the desiccant material adequately exsiccates only after the prior art system has been turned off for a time sufficient to accomplish same.

The present document, however, discloses a twin tower air drying system that overcomes the disadvantages of the prior art single tower system. First, the instant invention need not cycle off the source of unpurified air to purge the air drying system of accumulated moisture. The prior art system, however, does. Second, the instant twin tower system more efficiently exsiccates the air stream than does the prior art single tower system.

Regarding the first advantage, the instant system continuously supplies purified air to the pneumatic system to which it is attached. Specifically, while one drying assembly of the twin tower system operates in the drying mode and therein supplies dry air to the pneumatic system, the other drying assembly operates in the purge mode and is therein purged of moisture it previously accumulated. After a predetermined time, the instant invention switches the latter drying assembly to the drying mode and the former drying assembly to the purge mode. This switching continues until the source of pressurized air ceases supplying unpurified air to the instant system. Unlike the prior art system, the instant system need not deprive the pneumatic system of a steady supply of clean and dried compressed air while purging itself of moisture.

Regarding the second advantage, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

The foregoing background information is provided to assist the reader in understanding the instant invention and any terms of art used herein are not intended to be limited to any specific meaning unless specifically stated otherwise in this specification including the following detailed description.

SUMMARY OF THE INVENTION

In a presently preferred embodiment, the present invention provides a twin tower air drying system for cleaning and drying a stream of unpurified pressurized air received from a compressor unit so as to supply a stream of purified gas to a pneumatic system. The twin tower drying system includes a separating means, two coalescing elements, two towers each having desiccant material therein and a mechanism for controlling flow of unpurified and purified air streams through the twin tower system. The separating means serves as a first step in separating moisture and other particulates from the stream of unpurified air as the unpurified air passes therethrough. Each coalescing element further removes moisture remaining within the stream of unpurified air flowing from the separating means. A first tower removes moisture remaining within unpurified air received from a first coalescing element thereby supplying a first stream of purified air. A second tower removes moisture remaining within unpurified air received from a second coalescing element thereby supplying a second stream of purified air. The flow controlling mechanism enables the twin tower air drying system to alternately (i) extract moisture from the stream of unpurified air as it passes through the first coalescing element then through the first tower to supply the pneumatic system with an output percentage of the first stream of purified air while purging moisture both previously collected in the second tower and the second coalescing element by passing a purge percentage of the first stream through the second tower and the second coalescing element and expelling the remoisturized gas to atmosphere via the flow controlling mechanism and (ii) extract moisture from the stream of unpurified air as it passes through the second coalescing element then through the second tower to supply the pneumatic system with the output percentage of the second stream of purified air while purging moisture both previously collected in the first tower and the first coalescing element by passing the purge percentage of the second stream through the first tower and the first coalescing element and expelling the remoisturized gas to atmosphere via the flow controlling mechanism.

OBJECTS OF THE INVENTION

It is, therefore, a primary object of the present invention to provide a twin tower air drying system for cleaning and drying a stream of unpurified pressurized air received from a source thereof and for continuously supplying such purified air to a pneumatic system.

Another object of the present invention is to provide a twin tower air drying system for continuously supplying dry air to a pneumatic system such that the twin tower system alternately switches between removing moisture from unpurified air by passing it through a first drying assembly while purging from a second drying assembly moisture previously collected therein and removing moisture from unpurified air by passing it through the second drying assembly while purging from the first drying assembly moisture previously collected therein.

Yet another object of the present invention is to provide a twin tower air drying system for cleaning and drying a stream of unpurified pressurized air received from a source thereof and for continuously supplying such purified air to a pneumatic system such that the twin tower system need not cycle off the source of unpurified air (and therefore cut-off the supply of purified air to the pneumatic system) to purge the air drying system of accumulated moisture.

Still another object of the present invention is to provide a twin tower air drying system for continuously supplying dry air to a pneumatic system such that the twin tower system more efficiently exsiccates such air than does prior art single tower systems.

In addition to the objects and advantages of the twin tower air drying system set forth above, various other objects and advantages will become more readily apparent to those persons skilled in the gas drying system art from the detailed description of the invention, particularly, when considered in conjunction with the attached drawings and with the appended claims.

DETAILED DESCRIPTION OF THE PREFERRED EMBODIMENT

Figure 1:
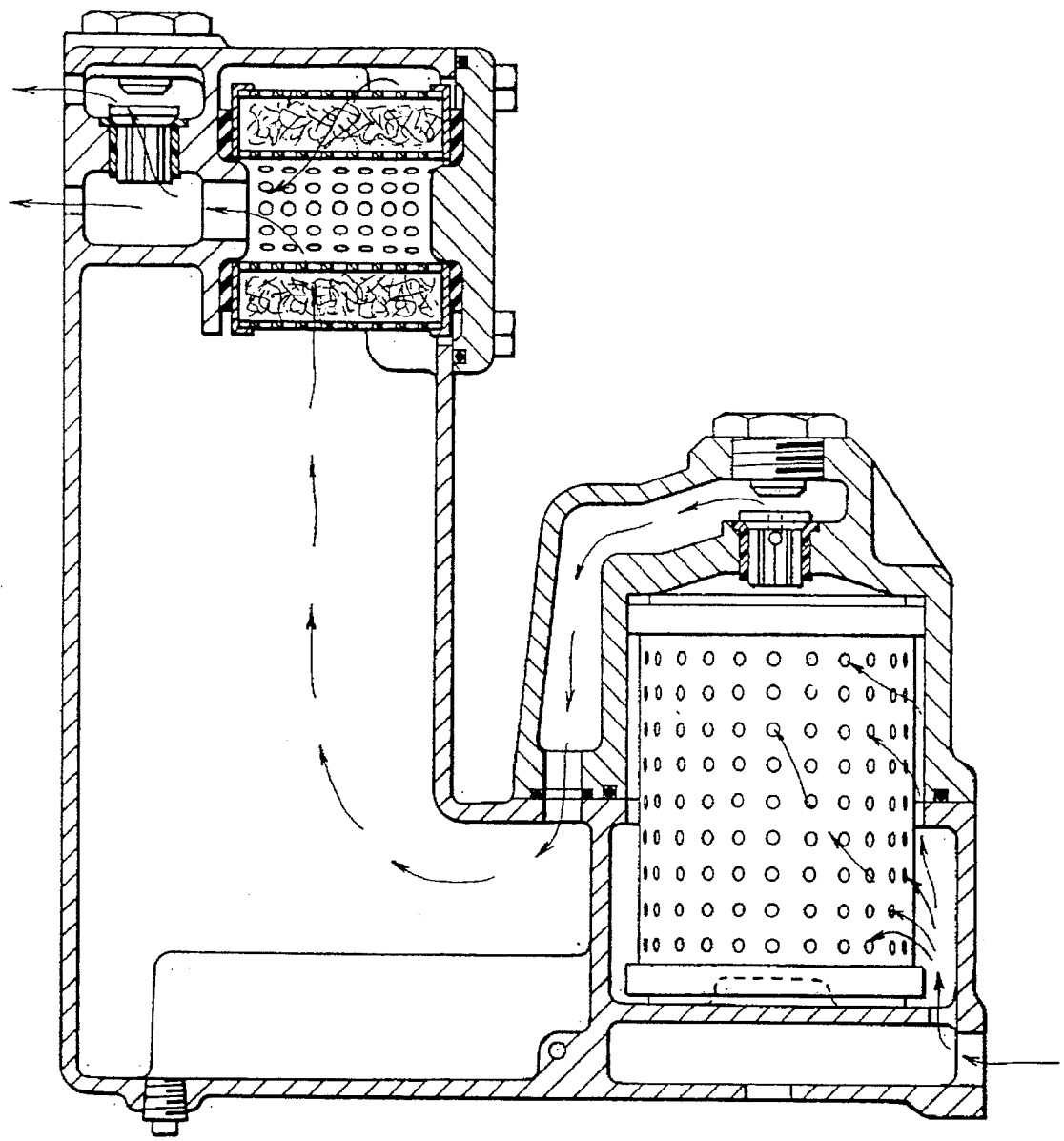
FIG. 1 is a cross-sectional view of a prior art single tower air drying system as illustrated in U.S. Pat. No. 5,423,129.

Before describing the present invention in detail, for the sake of clarity and understanding, the reader is advised that identical components having identical functions in each of the accompanying drawings have been marked with the same reference numerals throughout each of the several Figures illustrated herein.

Figure 2:
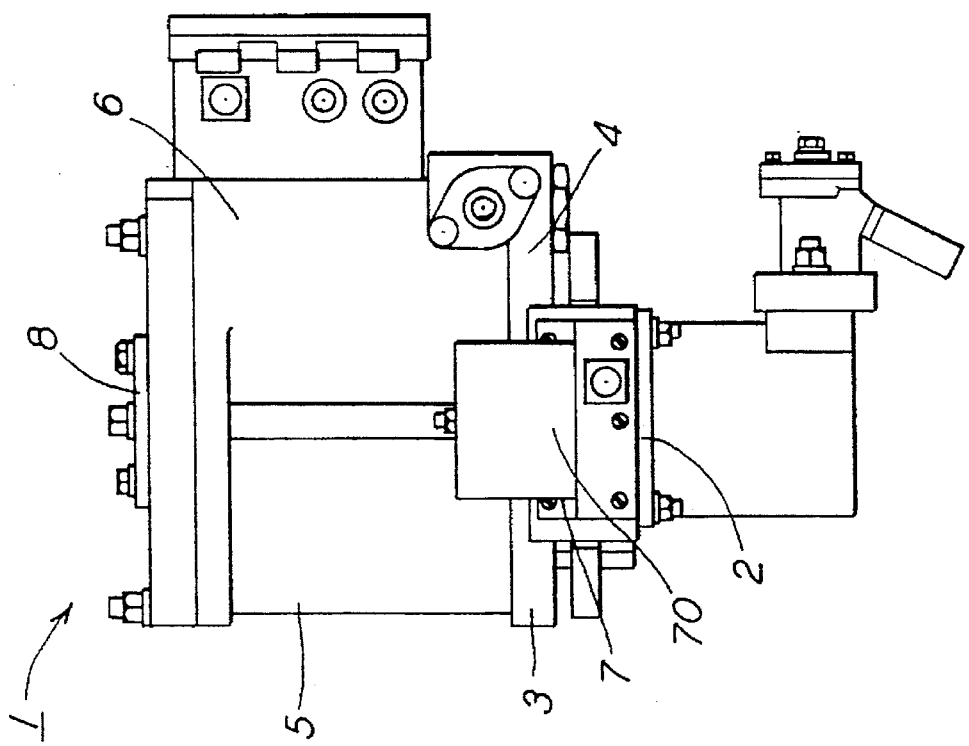
FIG. 2 is a schematic diagram of a twin tower air drying system illustrating a side dimensional view thereof including a separating device, a switching and purging mechanism, two drying assemblies and a check valve mechanism.
Figure 3:
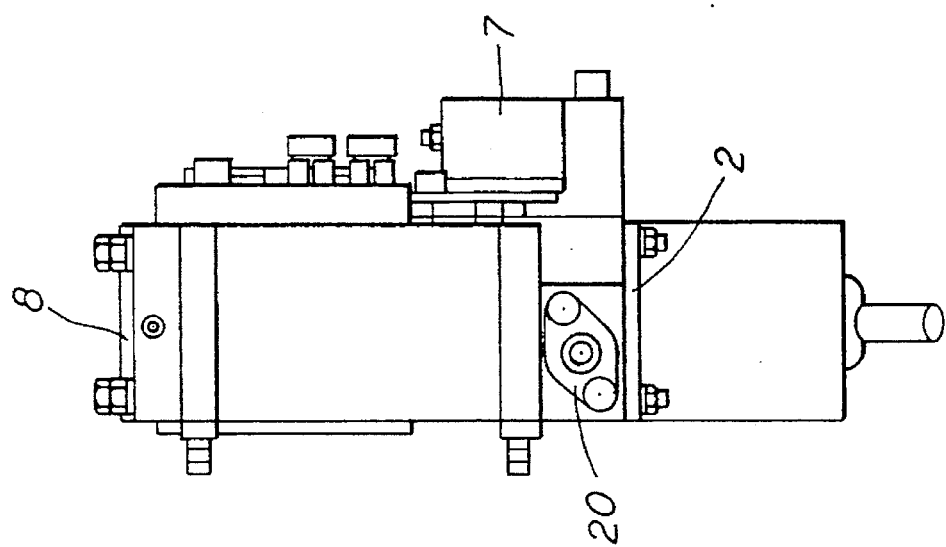
FIG. 3 is a schematic diagram of the twin tower air drying system illustrating another side dimensional view thereof including a separating device, a switching and purging mechanism, two drying assemblies and a check valve mechanism.

FIGS. 2 and 3 illustrate twin tower al details of a twin tower air drying system, generally designated 1. The twin tower system 1 cleans and dries a stream of unpurified pressurized air received from a source of compressed air so as to supply a pneumatic system with purified air. The unpurified air to be filtered will typically contain the vapor of various substances as well as moisture in the form of water or other liquids such as various oils. For the sake of brevity, the terms vapor and moisture are herein collectively referred to as "moisture." The unpurified air will also typically contain other particulates such as dirt, dust, pollen and various other contaminants.

Referring first to FIGS. 2 and 3, the twin tower air drying system i includes a separating means 2, two coalescing elements 3 and 4, two towers 5 and 6 each having desiccant material therein, a switching and purging means 7 and a check valve means 8. Described summarily, the twin tower system 1 cleans and dries unpurified air received from a source of pressurized air (not shown) to supply purified air to a pneumatic system (not shown). Through the function of the switching and purging means 7, the purified air is supplied alternately from each of the desiccant towers 5 and 6 through the check valve means 8 for distribution in an output percentage to the pneumatic system and in a purge percentage back into the twin tower system 1. The purge percentage of the cleaned and dried air is used to purge the twin tower system 1 of moisture it has previously collected.

The separating means 2 of the twin tower system 1 receives a stream of unpurified pressurized air from a compressor unit through a compressed air inlet 20. The separating means 2 serves as a first step in separating moisture and other particulates from the stream of unpurified air as the unpurified air passes therethrough. The separating means 2 includes a chamber and a sump. The chamber directs the unpurified air to flow generally counterclockwise within the chamber. This causes the heavier moisture and other particulates suspended therein to impact the interior walls of the chamber and fall into the sump. During continuous operation of the twin tower system 1, the moisture and other particulates centrifugally separated from the stream of unpurified air accumulate within the sump. Periodically and at any time the compressor cycles off, the twin tower system 1 opens a drain valve through which the collected fluid and particulates are forcefully expelled to atmosphere via pressure then contained within the twin tower system 1.

Through the switching and purging means 7, the separating means 2 supplies each of the coalescing elements 3 and 4 with the initially filtered stream of unpurified air. A first of the coalescing elements 3 connects to a first of the desiccant towers 5 and taken together or individually can be referred to as a first drying assembly. A second of the coalescing elements 4 connects to a second of the desiccant towers 6 and likewise can be referred to as a second drying assembly. Through the switching and purging means 7 as described in greater detail hereinafter, the first coalescing element 3 and the first desiccant tower 5 function on an alternating basis with the second coalescing element 4 and the second desiccant tower 6. The first coalescing element 3 further removes moisture contained within the initially filtered stream of unpurified air received from the separating means 2. The initially filtered stream is then passed through the first desiccant tower 5 wherein any moisture including vapor remaining therein is absorbed by the desiccant. Likewise, the second coalescing element 4 further removes moisture contained within the initially filtered stream of unpurified air received from the separating means 2. The initially filtered stream is then passed through the second desiccant tower 6 wherein any moisture including vapor remaining therein is absorbed by the desiccant. Flowing from the first desiccant tower 5 is cleaned and dried air referred to herein as a first stream of purified air. Flowing from the second desiccant tower 6 is cleaned and dried air referred to herein as a second stream of purified air. The first and second streams of purified air, however, flow on an alternating basis as controlled by the switching and purging means 7.

Figure 4:
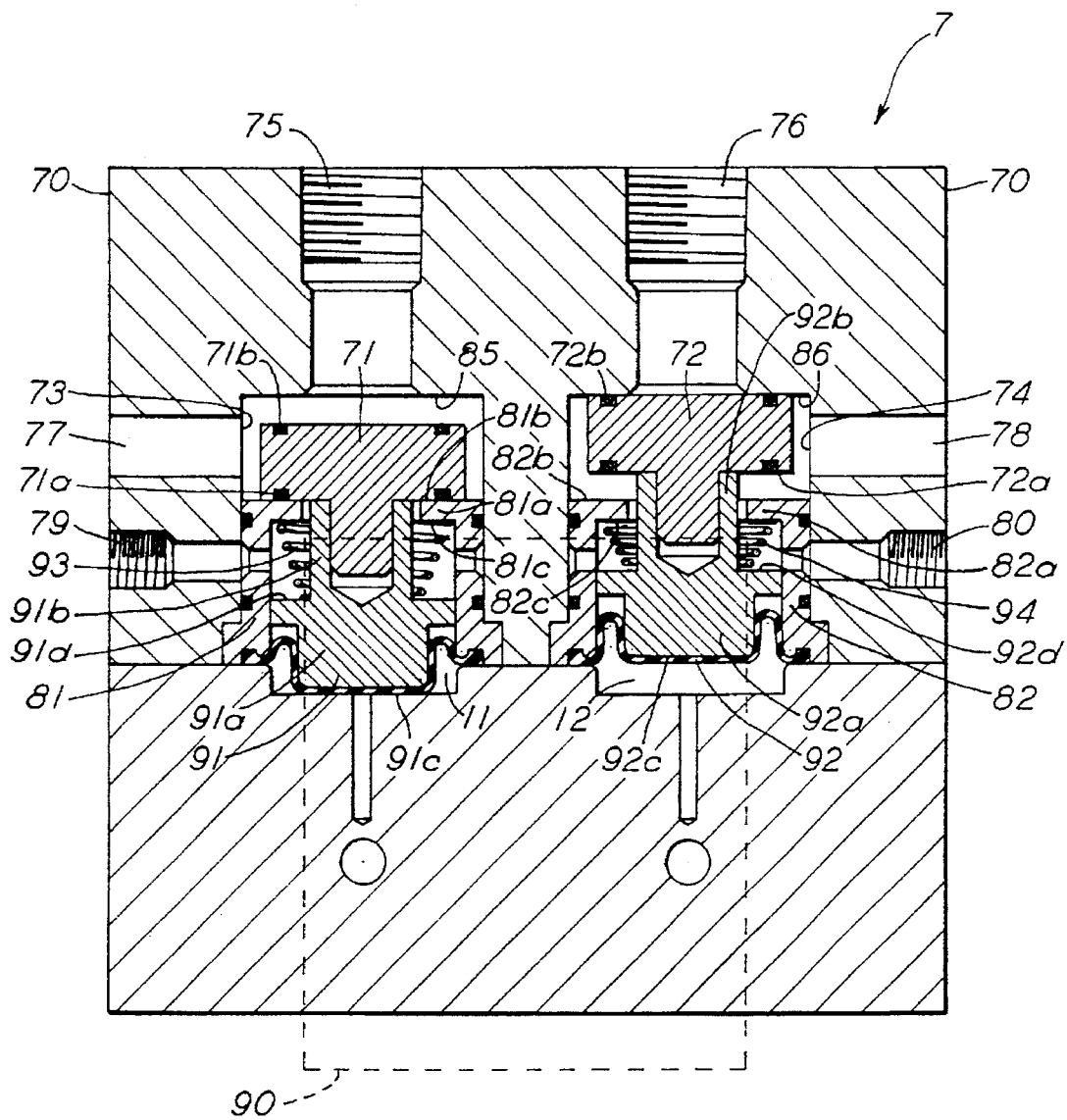
FIG. 4 is a cross-sectional schematic view of a switching and purging mechanism for the twin tower air drying system illustrating a first piston valve device (on the left) in a supply position and a second piston valve device in a purge position.

FIG. 4 illustrates the essential details of the switching and purging means 7 of the twin tower air drying system 1. The switching and purging means 7 includes a valve body 70, first and second valve stems 71 and 72, first and second valve cups 81 and 82, and a valve stem control means 90 (shown in part). The valve body 70 defines first and second piston bores 73 and 74, first and second supply passages 75 and 76, first and second output ports 77 and 78, and first and second purge ports 79 and 80. Each of the supply passages 75 and 76 connect to the source of unpurified pressurized air. The first and second valve cups 81 and 82 are concentrically disposed and affixed within the first and second piston bores 73 and 74, respectively. Together with first and second valve stems 71 and 72, valve cups 81 and 82 can be included within a piston valve means.

Piston bores 73 and 74, supply passages 75 and 76, output ports 77 and 78 and purge ports 79 and 80 relate structurally as follows. First supply passage 75 is communicable with first output port 77 through first piston bore 73, and second supply passage 76 is communicable with second output port 78 through second piston bore 74. First purge port 79 is communicable with first output port 77 through first piston bore 73, and second purge port 80 is communicable with second output port 78 through second piston bore 74.

Referring still to FIG. 4, the valve stem control means 90 of the switching and purging means 7 includes first and second diaphragm piston members 91 and 92, first and second biasing springs 93 and 94, first and second solenoid valves (not shown) and a pneumatic controller unit (not shown). The first and second diaphragm members 91 and 92 attach to the first and second valve stems 71 and 72, respectively. The first and second biasing springs 93 and 94 serve to bias first and second valve stems 71 and 72, respectively, as described below. Through the exhaust and supply valves (not shown) of the first and second solenoid valves, the pneumatic controller unit supplies pressure to and exhausts pressure from chambers 11 and 12. Diaphragm piston members 91 and 92 rise and fall accordingly thereby alternately moving first and second valve stems 71 and 72 periodically between a supply position and a purge position. Diaphragm members 91 and 92, springs 93 and 94, the solenoid valves and the pneumatic controller can be included within a piston control means.

The first and second springs 93 and 94 of the switching and purging means 7 serve to bias the first and second valve stems 71 and 72. Each of the diaphragm piston members 91,92 has a base portion 91a,92a and a symmetrically narrowed section 91b,92b arising therefrom for affixation to its respective valve stem 71,72. Each base portion 91a,92a has a bottom surface 91c,92c and an annular top surface 91d,92d. Each of the; valve cups 81,82 has an annular portion 81a,82a having an upper surface 81b,82b as a lower valve seat and an annular lower surface 81c,82c. The first biasing spring 93 sits compressed between the annular lower surface 81c of the first valve cup 81 and the annular top surface 91d of the base portion 91a of the first diaphragm piston member 91. Likewise, the second biasing spring 94 sits compressed between the annular lower surface 82c of the second valve cup 82 and the annular top surface 92d of the base portion 92a of the second diaphragm piston member 92. When the pneumatic controller unit of the valve stem control means 90 is turned off, the first and second biasing springs 93 and 94 hold the first and second valve stems 71 and 72, respectively, in the supply position.

It is, therefore, through the pneumatic controller unit of the switching and purging means 7 that first and second valve stems 71 and 72 each occupy alternatingly for a predetermined amount of time the supply and purge positions. Simply stated, when the first valve stem 71 occupies the supply position, the second valve stem 72 occupies the purge position and vice versa. Specifically, when the first valve stem 71 occupies the supply position, the first valve stem 71 seats against lower valve seat 81b of first valve cup 81. The first supply passage 75 and the first output port 77 communicate through first piston bore 73 while the first output port 77 and the first purge port 79 are isolated from one another. Simultaneously, the second valve stem 72 occupies the purge position in which the second valve stem 72 seats against an upper valve seat 86 of valve body 70. The second output port 78 and the second purge port 80 communicate through second piston bore 74 while the second supply passage 76 and the second output port 78 are isolated from one another.

Conversely, the first valve stem 71 occupies the purge position while the second valve stem 72 occupies the supply position. Specifically, when the first valve stem 71 occupies the purge position, the first valve stem 71 seats against an upper valve seat 85 of valve body 70. The first output port 77 and the first purge port 79 communicate through first piston bore 73 while the first supply passage 75 and the first output port 77 are isolated from one another. Simultaneously, the second valve stem 72 occupies the supply position in which the second valve stem 72 seats against lower valve seat 82b of second valve cup 82. The second supply passage 76 and the second output port 78 communicate through second piston bore 74 while the second output port 78 and the second purge port 80 are isolated from one another.

The switching and purging means 7 thus controls the direction of flow of the stream of unpurified air received from the separating means 2. By directing the flow of the stream of unpurified air through the twin tower system 1, the switching and purging means 7 also ultimately controls the flow of the first and second streams of purified gas from the desiccant towers 5 and 6 through the check valve means 8. Through the check valve means 8, purified gas from either the first or second streams flows to the pneumatic system in the output percentage and back into the twin tower system 1 in the purge percentage to purge moisture previously collected.

Figure 5C:
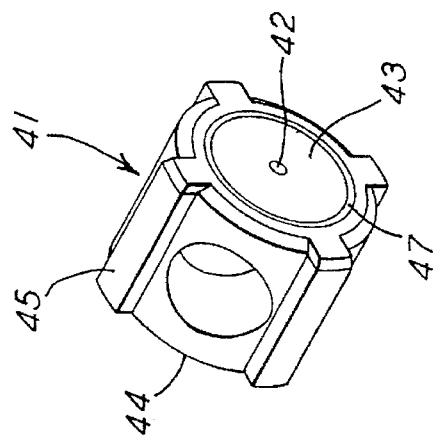
FIG. 5c is a perspective view of a shuttle choke device of the check valve mechanism illustrating a bearing surface and a purge orifice defined by the device.
Figure 5A:
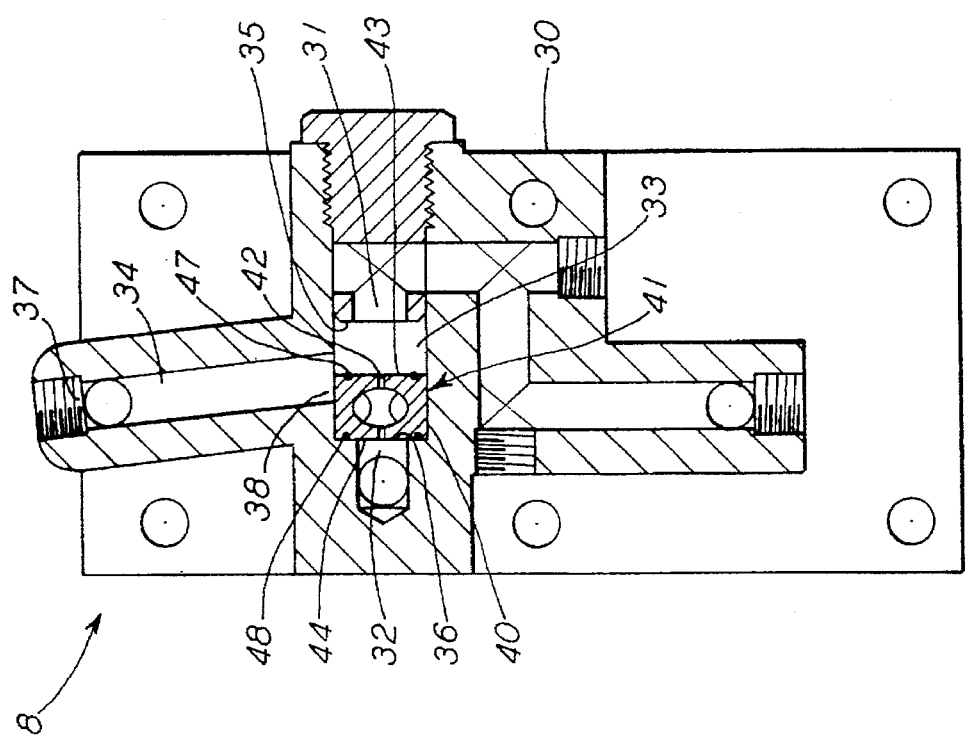
FIG. 5a is a cross-sectional schematic view of a check valve mechanism for the twin tower air drying system illustrating operation of the check valve mechanism when the first piston valve occupies the supply position and the second piston valve occupies the purge position.
Figure 5B:
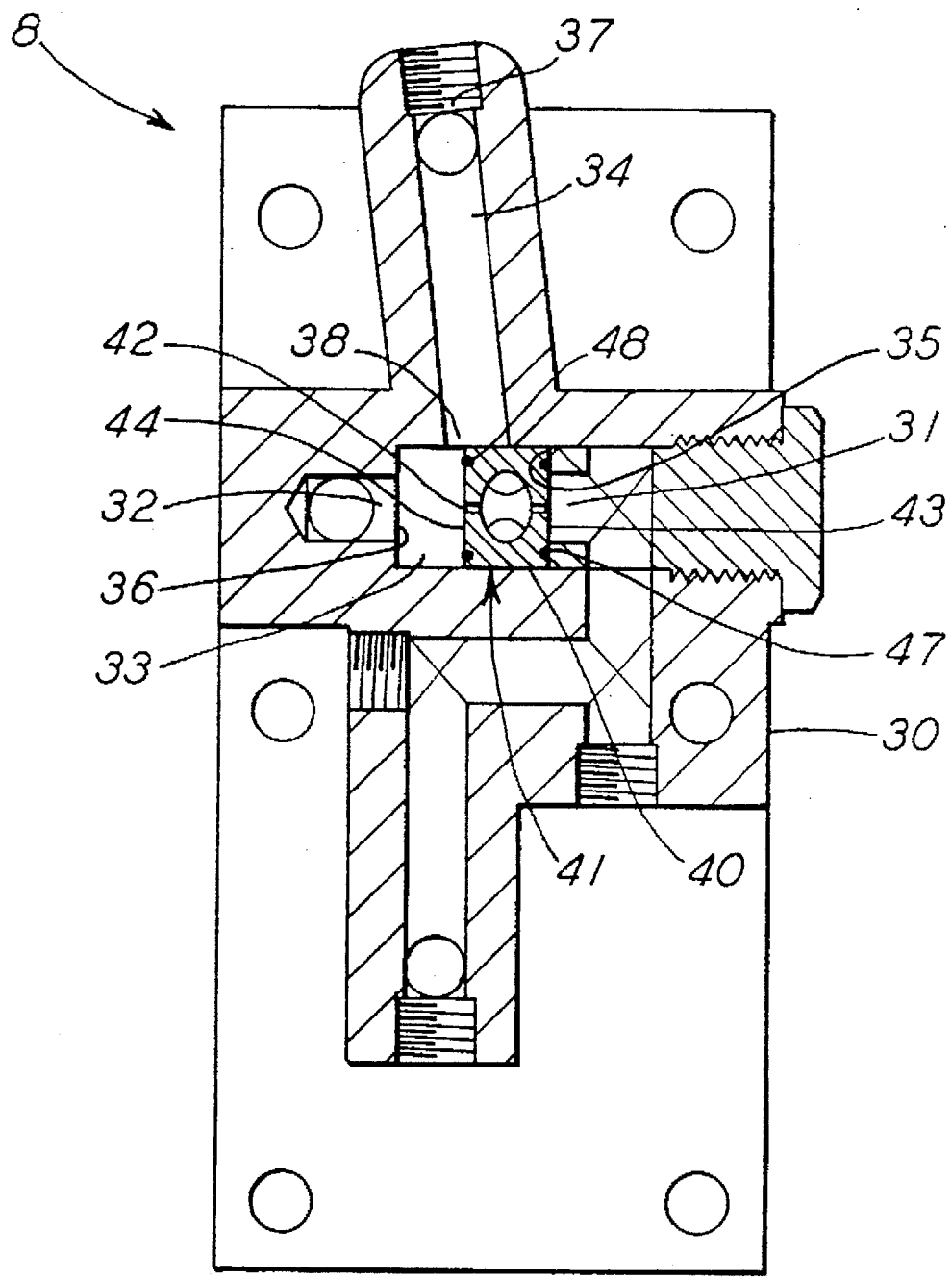
FIG. 5b is a cross-sectional schematic view of the check valve mechanism illustrating operation of the check valve mechanism when the second piston valve occupies the supply position and the first piston valve occupies the purge position.

FIGS. 5a, 5b and 5c illustrate the essential details of the check valve means 8 of the twin tower air drying system 1. The check valve means 8 includes a check valve body 30 and a shuttle choke means 40. The check valve body 30 defines a first channel 31 connected to the first desiccant tower 5, a second channel 32 connected to the second desiccant tower 6, a shuttle tube 33 having a first end 35 connected to the first channel 31 and a second end 36 connected to the second channel 32. The check valve body 30 also defines an output passage 34 having an initial end 37 communicating with the pneumatic system and a terminal end 38 communicable with shuttle tube 33. As shown in FIG. 5c, the shuttle choke means 40 includes a shuttle choke 41 for sliding between the ends 35 and 36 of shuttle tube 33, a first o-ring 47 and a second o-ring 48. The shuttle choke 41 defines a purge orifice 42 therethrough and has a first end 43, a second end 44 and a bearing surface 45. The bearing surface 45 controls rotation and axial movement of shuttle choke 41 as shuttle choke 41 slides between the first and second ends 35 and 36 of shuttle tube 33.

Referring now to FIGS. 2 through 5 for purposes of describing the operation of the twin tower system 1 and the various components thereof, the operation of the twin tower system 1 essentially has two phases. The pneumatic controller unit of the switching and purging means 7 ultimately controls automatically the cycling of the twin tower system 1 between these two phases of operation. In a first phase, valve stem 71 occupies the supply position while valve stem 72 occupies the purge position. For a predetermined amount of time, the pneumatic controller unit maintains valve stems 71 and 72 in their respective positions within piston bores 73 and 74. First and second valve stems 71 and 72 are then switched to the purge and supply positions, respectively. In this second phase, the pneumatic controller unit likewise maintains valve stems 71 and 72 in their respective positions within piston bores 73 and 74 for the predetermined amount of time. The pneumatic controller unit thus moves valve stems 71 and 72 back and forth between the supply and purge positions on an alternating basis.

FIG. 4 illustrates operation of the twin tower system 1 in the first phase of operation. First valve stem 71 occupies the supply position while second valve stem 72 occupies the purge position. The pneumatic controller achieves this first operational phase by simultaneously exhausting pressure from chamber 11 through the first solenoid valve and supplying pressure to chamber 12 through the second solenoid valve as shown in FIG. 4. Regarding first valve stem 71, the lack of pressure within chamber 11 allows the bias of spring 93 to force diaphragm piston member 91 and valve stem 71 attached thereto downwardly. Valve stem 71 seats against lower valve seat 81b of valve cup 81 thereby placing valve stem 71 in the supply position. A first lower valve seat o-ring 71a serves as a seal therebetween. Due to the seal between valve stem 71 and lower valve seat 81b, first output port 77 and first purge port 79 are cut off from each other. Regarding second valve stem 72, the build-up of pressure within chamber 12 overcomes the bias of spring 94 to force diaphragm piston member 91 and valve stem 71 attached thereto upwardly. Valve stem 72 seats against upper valve seat 86 of valve body 70 thereby placing valve stem 72 in the purge position. A second upper valve seat o-ring 72b serves as a seal therebetween. Due to the seal between valve stem 72 and upper valve seat 86, second supply passage 76 and second output port 78 are cut off from each other.

While in this first operating phase, the initially filtered stream of unpurified air received from separating means 2 flows into first supply passage 75 through first piston bore 73 through first output port 77 to first coalescing element 3. First coalescing element 3 further removes moisture contained within the initially filtered stream of unpurified air. The initially filtered stream then passes through the first desiccant tower 5. From first desiccant tower 5 flows the first stream of purified air. Having been stripped of vapor and nearly all other moisture remaining within the initially filtered stream, the first stream of purified air has a very low dewpoint temperature. From first desiccant tower 5, the first stream then flows into the first channel 31 of check valve means 8 of FIG. 5a. The first stream of purified air continues flowing from first channel 31 into shuttle tube 33. Due to the force of the first stream, shuttle choke 41 slides to the left within shuttle tube 33 and forcibly seals against the second end 36 of shuttle tube 33 courtesy of second o-ring 48. Shuttle choke 41 thus channels the first stream of purified air within check valve means 8. The output percentage of the first stream flows through output passage 34 to the pneumatic system. Simultaneously, the purge percentage of the first stream flows through the purge orifice 42 of the shuttle choke 41 into the second channel 32 of check valve means 8. The purge percentage of the first stream continues flowing through the second channel 32 into second desiccant tower 6 and then into the second coalescing element 4. Due to the very low dewpoint temperature of the air, vapor and other moisture previously retained within the second desiccant tower 6 and the second coalescing element 4 are reabsorbed by the purge percentage of the first stream of purified air passing therethrough. The now remoisturized air passes from the second coalescing element 4 through the second output port 78 through the second piston bore 74 to atmosphere via second purge port 80. First and second valve stems 71 and 72 remain in the supply and purge positions, respectively, (i.e., the first phase of operation continues) until the pneumatic controller unit switches to the second phase of operation after the predetermined amount of time.

The operation of the twin tower system 1 in the second phase of operation mirrors that of the first phase of operation. Though not illustrated herein, second valve stem 72 occupies the supply position while first valve stem 71 occupies the purge position. The pneumatic controller achieves this second operational phase by simultaneously exhausting pressure from chamber 12 through the second solenoid valve and supplying pressure to chamber 11 through the first solenoid valve. Regarding second valve stem 72, the lack of pressure within chamber 12 allows the bias of spring 94 to force diaphragm piston member 92 and valve stem 72 attached thereto downwardly. Valve stem 72 seats against lower valve seat 82b of valve cup 82 thereby placing valve stem 72 in the supply position. A second lower valve seat o-ring 72a serves as a seal therebetween. Due to the seal between valve stem 72 and lower valve seat 82b, second output port 78 and second purge port 80 are cut off from each other. Regarding first valve stem 71, the build-up of pressure within chamber 11 overcomes the bias of spring 93 to force diaphragm piston member 91 and valve stem 71 attached thereto upwardly. Valve stem 71 seats against upper valve seat 85 of valve body 70 thereby placing valve stem 71 in the purge position. A first upper valve seat o-ring 71b serves as a seal therebetween. Due to the seal between valve stem 71 and upper valve seat 85, first supply passage 75 and first output port 77 are cut off from each other.

While in this second operating phase, the initially filtered stream of unpurified air received from separating means 2 flows into second supply passage 76 through second piston bore 74 through second output port 78 to second coalescing element 4. Second coalescing element 4 further removes moisture contained within the initially filtered stream of unpurified air. The initially filtered stream then passes through the second desiccant tower 6. From second desiccant tower 6 flows the second stream of purified air. Having been stripped of vapor and nearly all other moisture remaining within the initially filtered stream, the second stream of purified air has a very low dewpoint temperature. From second desiccant tower 6, the second stream then flows into the second channel 32 of check valve means 8 of FIG. 5b. The second stream of purified air continues flowing from second channel 32 into shuttle tube 33. Due to the force of the second stream, shuttle choke 41 slides to the right within shuttle tube 33 and forcibly seals against the first end 35 of shuttle tube 33 courtesy of first o-ring 47. Shuttle choke 41 then channels the second stream of purified air within check valve means 8. The output percentage of the second stream flows through output passage 34 to the pneumatic system. Simultaneously, the purge percentage of the second stream flows through the purge orifice 42 of the shuttle choke 41 into the first channel 31 of check valve means 8. The purge percentage of the second stream continues flowing through the first channel 31 into first desiccant tower 5 and then into the first coalescing element 3. Due to the very low dewpoint temperature of the air, vapor and other moisture previously retained within the first desiccant tower 5 and the first coalescing element 3 are reabsorbed by the purge percentage of the second stream of purified air passing therethrough. The now remoisturized air passes from the first coalescing element 3 through the first output port 77 through the first piston bore 73 to atmosphere via first purge port 79. First and second valve stems 71 and 72 remain in the purge and supply positions, respectively, until the pneumatic controller unit switches after the predetermined amount of time back to the first phase of operation.

Preferably, the pneumatic controller unit is an electronic control unit having a timer component so that the electronic control unit automatically and alternately opens and closes the first and second solenoid valves every predetermined time period. Pressure is thus supplied to and exhausted from chambers 11 and 12 so that valve stems 71 and 72 switch back and forth between the supply and purge positions on an alternating basis.

The check valve mechanism 8 of the twin tower system 1 also includes a ball check device 39 situated within output passage 34. When the twin tower system 1 opens the drain valve of the separating means 2, the air pressure then contained within the twin tower system 1 expels through the drain valve carrying therewith to atmosphere fluid and particulate matter accumulated in the separating means 2. This causes ball check device 39 to seat forcibly against the terminal end 38 of output passage 34 thereby preventing clean and dried air that has already passed to the pneumatic system from flowing into the twin tower system 1 and eventually to atmosphere. Ball check device 39 thus maintains air pressure within the pneumatic system when the drain valve is opened. When the twin tower system 1 closes the drain valve, ball check device 39 allows flow of purified air from the twin tower system 1 through output passage 34 to the pneumatic system.

The switching and purging means 7 of the twin tower system 1 may optionally be equipped with two purge exhaust silencers (not shown). A first purge exhaust silencer may be employed to reduce noise associated with the purging of remoisturized air from first purge port 79. Likewise, a second purge exhaust silencer may be employed to reduce noise associated with the purging of remoisturized air from second purge port 80.

One noteworthy point apparent from the aforedescribed operation of the twin tower air drying system 1 relates to the function of switching and purging means 7 therein. The switching and purging means 7 not only directly controls the direction of flow of the stream of unpurified air through the twin tower system 1 but also ultimately determines the direction of flow of the first and second streams of purified air through check valve means 8. Accordingly, check valve means 8 and switching and purging means 7 can be collectively referred to as a means for controlling the flow of both the unpurified air stream and the purified air streams through the twin tower system 1.

A further noteworthy point relates to the operation of check valve means 8 within the twin tower system 1. The purge percentage corresponds to the size of the purge orifice 42 of the shuttle choke 41 of check valve means 8. This determines the amount of the first and second streams of purified air directed through the purge orifice 42 to purge moisture alternately from second tower 6 and second coalescing element 4 in the first operational phase and from first tower 5 and first coalescing element 3 in the second operational phase, respectively. The purge and output percentages are preferably ten (10%) and ninety (90%) percent, respectively.

The twin tower system 1 also includes a heating element for the drain valve. During cold temperature operation, the drain valve is heated to prevent freezing of the fluid and of the other particulates collected within the sump. This prevents clogging of the drain valve. The twin tower system 1 may optionally include a drain exhaust silencer to reduce noise associated with operation of the drain valve.

Another noteworthy matter pertains to the placement of the various electronic control components of the twin tower system 1. These are preferably housed in a single enclosure. The pneumatic controller unit of the switching and purging means 7 as well as an electronic heater element control unit may be housed in this single enclosure along with other electronic components such as the control for the drain valve.

While the presently preferred embodiment for carrying out the instant invention has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for a time prescribed by the Patent Act.

We claim:

1. A twin tower gas drying system for cleaning and drying a stream of unpurified pressurized gas received from a source thereof for use by a pneumatic system, said gas drying system comprising:

(a) a means, disposed within said gas drying system, for initially separating from such stream of unpurified gas moisture and other particulates suspended therein as such unpurified gas flows through said separating means;

(b) two coalescing elements each of which for removing moisture remaining within such stream of unpurified gas flowing from said separating means;

(c) a first tower having a first desiccant material therein for removing moisture remaining within such stream of unpurified gas received from a first of said coalescing elements so as to supply a first stream of purified gas therefrom;

(d) a second tower having a second desiccant material therein for removing moisture remaining within such stream of unpurified gas received from a second of said coalescing elements so as to supply a second stream of purified gas therefrom; and (e) a means for controlling flow of such unpurified and purified streams of gases through said gas drying system such that said gas drying system alternately switches between (i) extracting moisture from such unpurified gas passing through said first coalescing element then through said first desiccant material so as to supply such pneumatic system with an output percentage of such first stream of purified gas while purging moisture both previously collected in said second desiccant material and in said second coalescing element by passing a purge percentage of such first stream of purified gas through said second tower then through said second coalescing element and expelling such remoisturized gas to atmosphere via said means for controlling flow and (ii) extracting moisture from such unpurified gas passing through said second coalescing element and then through said second desiccant material so as to supply such pneumatic system with an output percentage of such second stream of purified gas while purging moisture both previously collected in said first desiccant material and in said first coalescing element by passing a purge percentage of such second stream of purified gas through said first tower then through said first coalescing element and expelling such remoisturized gas to atmosphere via said means for controlling flow.

2. The twin tower gas drying system as recited in claim 1 wherein said separating means includes:

(a) a chamber for directing flow of such stream of unpurified gas within said chamber such that such moisture and such other particulates centrifugally separate from such stream of unpurified gas; and (b) a sump, connected to said chamber, for accumulating such moisture and such other particulates precipitated centrifugally from such stream of unpurified gas.

3. The twin tower gas drying system as recited in claim 2 further including a drain valve for expelling to atmosphere fluid and such other particulates collected within said sump such that said gas drying system actuates said drain valve periodically and at any time such source of pressurized gas ceases supplying such stream of unpurified gas.

4. The twin tower gas drying system as recited in claim 3 further including a heater element for said drain valve so as to prevent during cold temperature operation freezing of such fluid and of such other particulates collected within said sump thereby preventing clogging of said drain valve therewith.

5. The twin tower gas drying system as recited in claim 3 further including a drain exhaust silencer to reduce noise associated with operation of said drain valve.

6. The twin tower gas drying system as recited in claim 3 wherein said means for controlling flow includes a ball check device so that:

(a) when said gas drying system opens said drain valve, such gas then contained within said gas drying system expels through said drain valve carrying therewith fluid and particulate matter accumulated in said sump to atmosphere causing said ball check device to plug said means for controlling flow so as to prevent such purified gas already passed to such pneumatic system from flowing into said gas drying system and to maintain pressure within such pneumatic system; and (b) when said gas drying system closes said drain valve, said ball check device allows flow of such purified gas from said gas drying system to such pneumatic system.

7. The twin tower gas drying system as recited in claim 6 wherein said means for controlling flow includes:

(a) a check valve means having said ball check device, said check valve means for affecting flow of such purified gas between said towers and such pneumatic system via said ball check device and between said first tower and said second tower in said purge percentage; and (b) a switching and purging means for controlling direction of flow of such stream of unpurified gas received from said separating means thereby controlling flow of such purified gas within said gas drying system via said check valve means.

8. The twin tower gas drying system as recited in claim 1 further including a purge exhaust silencer for reducing noise associated with flow of such remoisturized gas to atmosphere via said means for controlling flow.

9. A twin tower gas drying system for cleaning and drying a stream of unpurified pressurized gas received from a source thereof for use by a pneumatic system, said gas drying system comprising:

(a) a means, disposed within said gas drying system, for initially separating from such stream of unpurified gas moisture and other particulates suspended therein as such unpurified gas flows through said separating means;

(b) two coalescing elements each of which for removing moisture remaining within such stream of unpurified gas flowing from said separating means;

(c) a first tower having a first desiccant material therein for removing moisture remaining within such stream of unpurified gas received from a first of said coalescing elements so as to supply a first stream of purified gas therefrom;

(d) a second tower having a second desiccant material therein for removing moisture remaining within such stream of unpurified gas received from a second of said coalescing elements so as to supply a second stream of purified gas therefrom;

(e) a check valve means for affecting flow of such streams of dry gas between said towers and such pneumatic system and between said first tower and said second tower; and (f) a switching and purging means for controlling direction of flow of such stream of unpurified gas received from said separating means thereby controlling flow of such streams of purified gas within said gas drying system via said check valve means;

such that said switching and purging means switches said gas drying system alternately between (i) extracting moisture from such stream of unpurified gas passing through said first coalescing element then through said first tower wherefrom such first stream of purified gas flows through said check valve means wherein said first stream is directed in an output percentage to such pneumatic system and in a purge percentage to and through said second tower through said second coalescing element to atmosphere via said switching and purging means thereby purging said second desiccant material and said second coalescing element of moisture previously collected therein and (ii) extracting moisture from such stream of unpurified gas passing through said second coalescing element then through said second tower wherefrom such second stream of purified gas flows to said check valve means wherein said second stream is directed in said output percentage to such pneumatic system and in said purge percentage to and through said first tower through said first coalescing element to atmosphere via said switching and purging means thereby purging said first desiccant material and said first coalescing element of moisture previously collected therein.

10. The twin tower gas drying system as recited in claim 9 wherein said separating means includes:

(a) a chamber for directing flow of such stream of unpurified gas within said chamber such that such moisture and such other particulates centrifugally separate from such stream of unpurified gas; and (b) a sump, connected to said chamber, for accumulating such moisture and such other particulates precipitated centrifugally from such stream of unpurified gas.

11. The twin tower gas drying system as recited in claim 10 further including a drain valve for expelling to atmosphere fluid and such other particulates collected within said sump such that said gas drying system actuates said drain valve periodically and at any time such source of pressurized gas ceases supplying such stream of unpurified gas.

12. The twin tower gas drying system as recited in claim 11 further including a heater element for said drain valve so as to prevent during cold temperature operation freezing of such fluid and of such other particulates collected within said sump thereby preventing clogging of said drain valve therewith.

13. The twin tower gas drying system as recited in claim 11 further including a drain exhaust silencer to reduce noise associated with operation of said drain valve.

14. The twin tower gas drying system as recited in claim 11 wherein said check valve means includes a ball check device so that:

(a) when said gas drying system opens said drain valve, such gas then contained within said gas drying system expels through said drain valve carrying therewith fluid and particulate matter accumulated in said sump to atmosphere causing said ball check device to plug said check valve means so as to prevent such purified gas already passed to such pneumatic system from flowing into said gas drying system and to maintain pressure within such pneumatic system; and (b) when said gas drying system closes said drain valve, said ball check device allows flow of such purified gas from said gas drying system to such pneumatic system.

15. The twin tower gas drying system as recited in claim 9 further including a purge exhaust silencer for reducing noise associated with flow of such remoisturized gas to atmosphere via said switching and purging means.

16. A twin tower gas drying system for cleaning and drying a stream of unpurified pressurized gas received from a source thereof for use by a pneumatic system, said gas drying system comprising:

(a) a chamber, disposed within said gas drying system, for centrifugally separating from such stream of unpurified gas moisture and other particulates suspended therein as such unpurified gas flows through said chamber;

(b) a sump, connected to said chamber, for accumulating such moisture and such other particulates precipitated centrifugally from such stream of unpurified gas;

(c) two coalescing elements each of which for removing moisture remaining within such stream of unpurified gas flowing from said chamber;

(d) a first tower having a first desiccant material therein for removing moisture remaining within such stream of unpurified gas received from a first of said coalescing elements so as to supply a first stream of purified gas therefrom;

(e) a second tower having a second desiccant material therein for removing moisture remaining within such stream of unpurified gas received from a second of said coalescing elements so as to supply a second stream of purified gas therefrom;

(f) a check valve means for affecting flow of such streams of dry gas between said towers and such pneumatic system and between said first tower and said second tower; and (g) a switching and purging means for controlling direction of flow of such stream of unpurified gas received from said separating means thereby controlling flow of such streams of purified gas within said gas drying system via said check valve means;

such that said switching and purging means switches said gas drying system alternately between (i) a first operational phase for extracting moisture from such stream of unpurified gas passing through said first coalescing element then through said first tower wherefrom such first stream of purified gas flows through said check valve means wherein said first stream is directed in an output percentage to such pneumatic system and in a purge percentage to and through said second tower through said second coalescing element to atmosphere via said switching and purging means thereby purging said second desiccant material and said second coalescing element of moisture previously collected therein and (ii) a second operational phase for extracting moisture from such stream of unpurified gas passing through said second coalescing element then through said second tower wherefrom such second stream of purified gas flows to said check valve means wherein said second stream is directed in said output percentage to such pneumatic system and in said purge percentage to and through said first tower through said first coalescing element to atmosphere via said switching and purging means thereby purging said first desiccant material and said first coalescing element of moisture previously collected therein.

17. The twin tower gas drying system as recited in claim 16 further including a drain valve for expelling to atmosphere fluid and such other particulates collected within said sump such that said gas drying system actuates said drain valve periodically and at any time such source of pressurized gas ceases supplying such stream of unpurified gas.

18. The twin tower gas drying system as recited in claim 17 further including a heater element for said drain valve so as to prevent during cold temperature operation freezing of such fluid and of such other particulates collected within said sump thereby preventing clogging of said drain valve therewith.

19. The twin tower gas drying system as recited in claim 17 further including a drain exhaust silencer to reduce noise associated with operation of said drain valve.

20. The twin tower gas drying system as recited in claim 17 wherein said check valve means includes a ball check device so that:

(a) when said gas drying system opens said drain valve, such gas then contained within said gas drying system expels through said drain valve carrying therewith fluid and particulate matter accumulated in said sump to atmosphere causing said ball check device to plug said check valve means so as to prevent such purified gas already passed to such pneumatic system from flowing into said gas drying system and to maintain pressure within such pneumatic system; and (b) when said gas drying system closes said drain valve, said ball check device allows flow of such purified gas from said gas drying system to such pneumatic system.

21. The twin tower gas drying system as recited in claim 16 further including a purge exhaust silencer for reducing noise associated with flow of such remoisturized gas to atmosphere via said switching and purging means.

22. The twin tower gas drying system as recited in claim 17 wherein said first and said second operation phases each last for a predetermined amount of time.

* * * * *

UNITED STATES PATENT AND TRADEMARK OFFICE
CERTIFICATE OF CORRECTION

PATENT NO. : 5,662,727
DATED : September 2, 1997
INVENTOR(S) : T. Kevin Castle, et al.

It is certified that error appears in the above-identified patent and that said Letters Patent is hereby corrected as shown below:

Column 5, line 5, please delete "twin tower al" and insert --the essential--;

column 5, line 18, please delete "i" and insert --1--.

Column 6, line 64, please delete ";".

Signed and Sealed this

First Day of September, 1998

Attest:

BRUCE LEHMAN

Attesting Officer

Commissioner of Patents and Trademarks